Oct. 9, 1934.  W. D. EGLINTON  1,975,894
FOLDING SPECTACLES
Filed July 5, 1932

Patented Oct. 9, 1934

1,975,894

UNITED STATES PATENT OFFICE 1,975,894

FOLDING SPECTACLES

William David Eglinton, Croydon, England

Application July 5, 1932, Serial No. 620,947
In Great Britain July 21, 1931

4 Claims. (Cl. 88—44)

This invention relates to folding spectacles.

An important consideration in the manufacture of folding spectacles is to provide that the eye pieces are in precise alignment when the spectacles are in the open position for use, but will readily fold up in close juxtaposition when not required for use. An effective method of accomplishing this is disclosed in my British Patent No. 340,613.

The present invention concerns an alternative method and the invention may be said to consist broadly in providing means whereby each eye piece is capable of movement in two directions.

If the eye pieces of the spectacles are hinged to the bridge angularly as provided for in my prior patent before referred to some advantage may be obtained where it is required to provide for very thick lenses by providing an extra hinge in the bridge so disposed that the eye pieces can be twisted or turned relatively one to the other about an axis running longitudinally of the bridge but in cases where the hinges connecting the eye pieces to the bridge are disposed at right angles to the line of alignment it is necessary to provide two additional hinge points—one for each eye piece. One convenient way of effecting this is to provide, in addition to the usual hinge a second hinge at right angles so as to provide for universal movement. The particular construction of the hinges may vary in many ways so long as each eye piece has facility for movement in two directions at angles to each other.

In the accompanying drawing I have shown by way of example one method of carrying out my invention.

Figure 1:
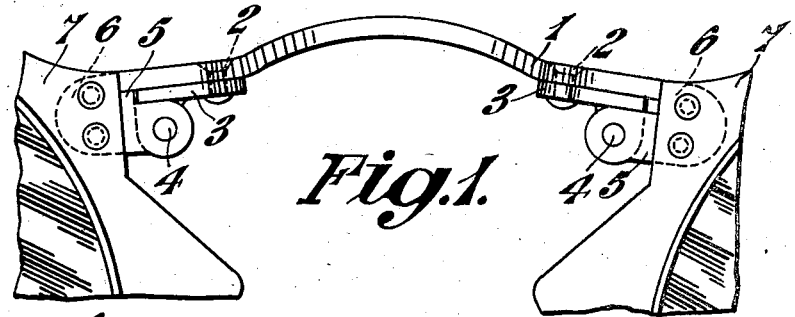
Figure 2:
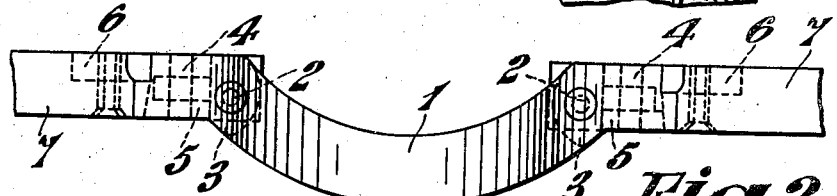

In this drawing Fig. 1 is a front elevational view of a folding spectacle bridge in accordance with my invention attached to the rims of eye pieces and shown in the open position. Fig. 2 is a plan view thereof and Fig. 3 is a similar view showing the position of the bridge relative to the eye pieces in the folded up position.

Referring to this drawing the numeral 1 designates the bridge which is of substantially rigid construction. This bridge 1 is pivoted at 2 by substantially vertical pivots to elements 3 which are in turn hinged or pivoted at 4, by substantially horizontal pivots, to a fastening fitment 5 having lugs 6 by means of which the fastening fitment is secured to the rims 7 of the eye pieces of the spectacles. The bridge 1 is provided with cut away portions as indicated at 8 which, when the spectacles are in open or operative position interlock or register with stops 9 on the elements.

Figure 3:
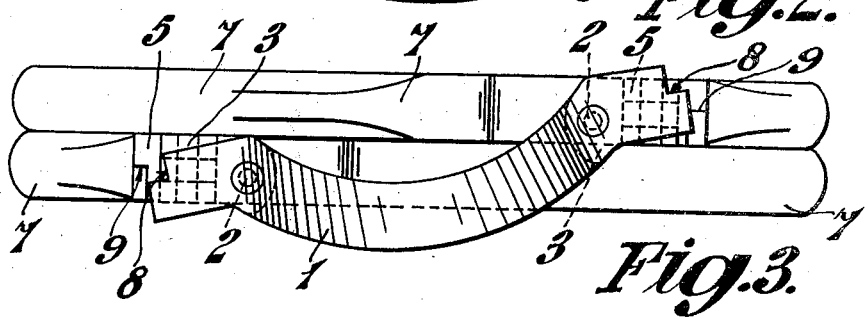

It will be seen that by this arrangement the eye pieces of the spectacles can in the folding up operation be turned out of alignment about the pivots 2 sufficiently to give clearance for the eye pieces, however thick the lenses may be, so that the eye pieces can be brought into juxtaposition by movement about the horizontal hinges or pivots 4 as shown in Fig. 3.

What I claim and desire to secure by Letters Patent is:—

1. A pair of folding spectacles comprising a bridge, a plate hinged to each end of said bridge by vertically disposed pivots, a fastening fitment hinged by horizontally disposed pivots to each of said plates and an eye-piece attached to each of said fastening fitments.

2. A pair of folding spectacles comprising a bridge, a pair of eye-pieces, a pair of fastening fitments attached to said eye-pieces, a pair of plates, a pair of hinges having vertical pivots connecting one of said plates to each end of said bridge, and a second pair of hinges having horizontal pivots connecting one of said plates to each of said fastening fitments.

3. Folding spectacles comprising a pair of eye-pieces, fastening fitments rigidly attached to the rim of each of said eye-pieces, hinged elements projecting inwardly in opposite directions from said fitments, pivotal connections between said fastening fitments and said hinged elements disposed at right angles to the plane of the eye-pieces, a rigid bridge connecting the hinged elements, and pivotal connections between said bridge and said hinged elements, disposed at right angles to the pivotal connections between the fastening fitments and the hinged elements.

4. A pair of folding spectacles comprising eye-pieces, a rigid bridge, a fastening fitment attached to each eye-piece, a plate hinged to each fitment by a horizontally disposed pivot, and vertically disposed pivots connecting the bridge to each of said plates at positions adjacent its ends whereby said eye-pieces can be moved from alignment about said vertically disposed pivots and then folded edgewise towards each other about said horizontally disposed pivots to lie superimposed one upon the other in folded position.

WILLIAM DAVID EGLINTON.